United States Patent [19]
Watterback

[11] 3,817,192
[45] June 18, 1974

[54] FURNACE, PARTICULARLY FOR COMBUSTION OF GARBAGE AND SEWAGE SLUDGE

[75] Inventor: Paul Gunnar Wätterbäck, Stockholm, Sweden

[73] Assignee: Arbman Development AB, Stockholm, Sweden

[22] Filed: Mar. 9, 1973

[21] Appl. No.: 339,793

[30] Foreign Application Priority Data
Mar. 13, 1972 Sweden.................... 3161/72

[52] U.S. Cl............................ 119/8 C, 110/28 F
[51] Int. Cl................................... F23g 5/12
[58] Field of Search........ 110/8 R, 8 C, 18 R, 18 C, 110/28 F

[56] References Cited
UNITED STATES PATENTS
| | | | |
|---|---|---|---|
| 3,396,681 | 8/1968 | Hubbard | 110/28 |
| 3,482,533 | 12/1969 | Ankersen | 110/8 |
| 3,500,775 | 3/1970 | Hubbard | 110/8 |
| 3,702,594 | 11/1972 | Howes | 110/8 |
| 3,745,940 | 7/1973 | Hibbert | 110/8 |

Primary Examiner—Kenneth W. Sprague
Attorney, Agent, or Firm—Sughrue, Rothwell, Mion, Zinn & Macpeak

[57] ABSTRACT

A furnace, especially for combustion of garbage and sewage sludge comprises a cylindrical combustion chamber having a horizontal or vertical axis. The radius of the combustion chamber substantially corresponds to or is preferably bigger than the width or height, respectively, of the chamber which has one or more tangential inlets and a central axially directed outlet. A spiral-shaped flame containing partly still unburnt particles rotating in the outer part of the combustion zone and partly largely burnt dust-like ash particles rotating in or towards the centre of the gas whirl, which escapes through the gas outlet, is generated.

6 Claims, 4 Drawing Figures

PATENTED JUN 18 1974 3,817,192

FURNACE, PARTICULARLY FOR COMBUSTION OF GARBAGE AND SEWAGE SLUDGE

The present invention relates to a furnace, particularly for combustion of garbage and sewage sludge, of the kind which comprises a substantially cylindrical combustion chamber with a mainly tangentially directed inlet for combustion products and preheated intake air under pressure, a means of ignition such as an oil burner and a gas outlet at the centre of the furnace.

According to DOS 2,051,381 there is previously known a furnace of this type having a long axial length and a rather complicated construction, a number of axially spaced fans being necessary to uphold the combustion operation.

According to the Swedish Pat. specification No. 332,481 there is also known a reactor for heat treatment of sludge, which consists of a housing with two end walls and a lengthwise inner wall, in which housing there is a lining of heat-conducting material, so that a gas chamber is formed between the housing wall and the outer wall of the lining. Close by one end of the housing there is also a device for spraying sludge towards the inner surface of the heated lining. The spraying device comprises a nozzle which has a first line arranged to receive the sludge and a second line inside the first line arranged to receive air under pressure, whereupon the nozzle is designed and elaborated to direct a jet towards the interior of the heated lining, in addition to which the nozzle is elaborated to move itself so that the jet wanders ever a selected pattern of the lining.

This previously known device has, despite its relatively complicated design, only limited possibilities of use, while moreover the efficiency of the combustion process will be relatively low.

One object of the present invention is to achieve a furnace in which the aforesaid disadvantages are eliminated and in which an intensive combustion process takes place in the furnace chamber so that practically total ashing of the combustion products occurs.

A further object is to achieve a furnace in which a simple possibility is offered of utilizing the supplied intake air to cool the furnace, so that improved thermal economy and increased protection of the furnace material are obtained.

A particular object of one embodiment of the invention is to achieve a furnace of the stated kind, in which entering sand particles and similar incombustibles are separated in connection with the combustion process and in which these particles can be utilized to contribute to grinding up of the combustion products.

A furnace according to the present invention, which fulfils these objects, is mainly characterized in that the axial extension of the cylindrical combustion chamber substantially corresponds to or is preferably less than the radius of the chamber, so that formed between the mainly tangentially directed inlet and the outlet is a spiral-shaped flame containing partly still unburnt particles which, under the influence of the centrifugal force, rotate in the outer part of the combustion zone, and partly largely burnt, dust-like ash particles rotating in or towards the centre of the gas whirl, which depart through the gas outlet.

The compact design of the furnace provides a number of advantageous over prior constructions. Thus, the spiral-shaped flame obtains a large length are permits an increased furnace capacity and a so adapted combustion time that the particles are kept in the combustion zone during intensive burning until they have become totally ashed. The furnace temperature will be considerably higher than in a conventional combustion process and consequently a furnace according to the invention can be said to work as a hot-gas generator.

In practice, it is preferred that at the tangentially directed inlet there be situated a deflection means, which is arranged to deflect fed-in products towards the outer wall of the combustion chamber. The said deflection means can suitably consist of an extended section of the outer wall of the combustion chamber. The deflection means also makes it possible to feed in new material without disturbing the combustion process.

On the outside of that section of the outer wall of the combustion chamber towards which the fed-in products are deflected, there is appropriately a duct for supply of preheated intake air, in addition to which the said wall section is perforated so that the intake air is supplied directly to the admitted products.

The said intake or blasting air further contributes towards the intensity of the combustion process and protects the perforated plate by creating a barrier layer which prevents direct contact between burning particles and the plate.

In addition, it is preferred that an essential portion of the combustion chamber is surrounded by an intake duct for blasting air, which absorbing heat from the combustion chamber serves for cooling of the outer wall thereof.

Further features of a furnace according to the invention will be revealed by the following description of some embodiments thereof. The description refers to the accompanying schematic drawing.

Figure 1:
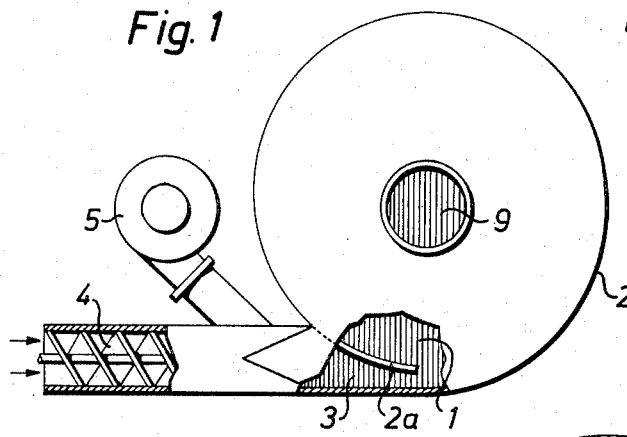
FIG. 1 is a partly cut-away side view of a first embodiment of a furnace according to the invention, which furnace has a largely cylindrical combustion chamber with a horizontal axis.
Figure 2:
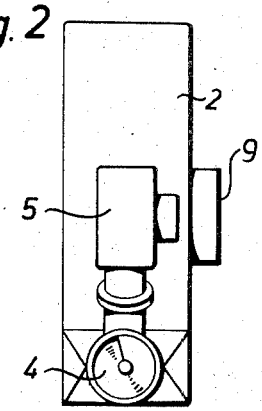
FIG. 2 is a view of the furnace according to FIG. 1 seen in the fed-in direction.

Referring to FIGS. 1 and 2 a furnace for combustion of dried sewage sludge or garbage consists of an essentially cylindrical combustion chamber 1 limited by a shell 2 of acid-resistant stainless material, e.g. steel. The combustion chamber 1 has a largely tangentially directed inlet 3 for the combustion product, in which inlet there is a stoker device 4, with the aid of which the sewage sludge is fed in. In the vicinity of the inlet there is furhter an oil burner 5, which serves as ignition means for initiation of the combustion process. The axial width of the combustion chamber 1 is less than its radius, and the stoker device opens centrally between the two substantially plane end faces of the chamber.

With the aid of a deflection means 2a, admitted sludge is deflected outwards towards the outer wall of the combustion chamber. The deflection means consists of a section 2a of the outer wall coming from the opposite direction of the shell of the combustion chamber. By means of one or more fans not shown in FIG.

preheated blasting air is admitted to the combustion chamber. From the central part of the combustion chamber there goes an axially deflected outlet 9.

In the combustion process a spiral-shaped flame is formed, which flame partly contains still unburnt particles, which are kept rotating in the outer part of the combustion zone by the centrifugal force, and partly contains largely burnt dust-like ash particles which rotate in the centre of the gas whirl and in due course depart through the furnace outlet 9.

In consequence of the distribution of the sludge in the combustion chamber, the high temperature reached and the high speed of the blasting air supplied to the combustion whirl, the combustion will be extremely intensive. On account of this, the furnace has a combustion capacity which is substantially increased in relation to previously known furnaces.

Figure 3:
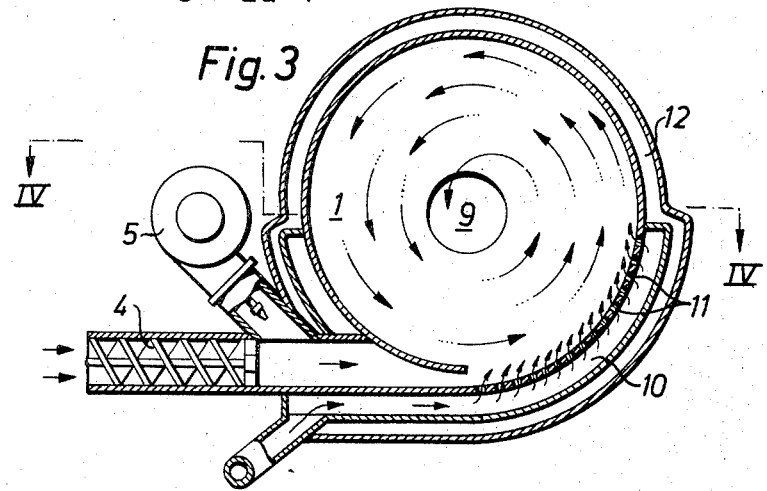
FIG. 3 is a section through a modified embodiment, wherein the mainly cylindrical combustion chamber of the furnace has a vertical axis.
Figure 4:
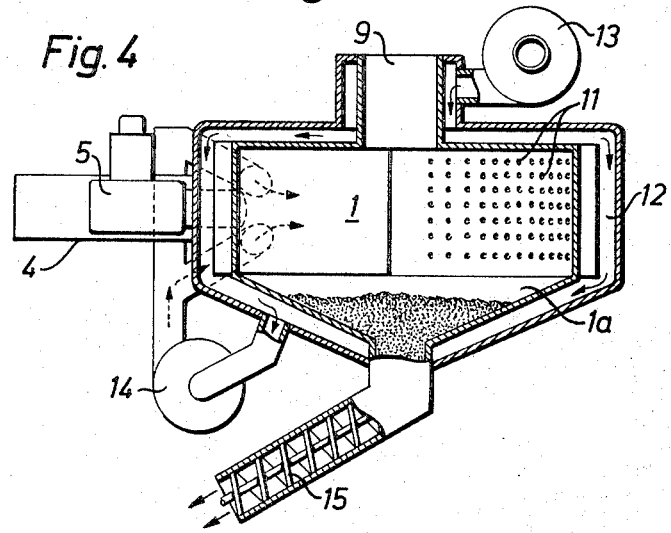
FIG. 4 is a section through the furnace shown in FIG. 3 taken along the line IV—IV in the latter figure.

The largely cylindrical combustion chamber for the modified embodiment shown in FIGS. 3 and 4 has a vertical axis. As in the above described embodiment, the combustion chamber has a tangential inlet 3 with a stoker device 4, a deflection means 2a for admitted sludge and an ignition device such as an oil burner 6. Again, the axial extension of height of the cylindrical part of the combustion chamber decreases the radious of the chamber.

On the outside of that section of the combustion chamber towards which the combustion products are deflected upon admission, there is a duct 10 for supply of preheated intake air under pressure. The peripherally outer wall of the combustion chamber is at this point provided with performations 11, so that the air flowing through the duct 10 is supplied directly to the fed-in sludge. At the same time, the perforated wall is cooled and protects against direct contact from burning sludge particles.

Practically the whole of the combustion chamber 1 is surrounded by an intake duct 12, through which blasting air is made to circulate with the aid of fans 13 and 14. The blasting air is then substantially preheated, at the same times as a cooling of the shell of the combustion chamber is achieved. The blasting air commences its circulation in the area for the furnace outlet 9, where the cooling need is the greatest and is supplied finally to the combustion chamber via the aforesaid in perforations 11 emanating duct 10.

The lower part of the furnace has a conical, downward tapering form. Collected in the conical lower part is incombustible sand present in the sludge as well as coarse slag particles, which are discharged by means of a stoker device 15 and collected. Before the sand is accumulated in the lower part of the furnace it will, at any rate in part, participate in the whirl process in the furnace and thus contribute to grinding up the sludge particles which are to be burnt.

The end sides of the furnace are united with its peripheral outer wall by means of spring-loaded bolted joints. By this means, the large heat movements in the furnace material can be absorbed.

The dust-polluted exhaust gases leaving the furnace are suitably conducted to a particle separator. Surplus heat generated in the furnace during the combustion process can be utilized in a suitable manner.

I claim:
1. A furnace, particularly for combustion of garbage and sewage sludge comprising:
   a. a combustion chamber defined by a cylindrical wall having at least one inlet opening therethrough the height of said cylindrical wall being equal to or less than the radius of the cylinder, a first end plate attached to one end of said cylindrical wall, said first end plate having an opening therethrough concentric with its central axis to allow the escape of exhaust gases from said chamber, and a second end plate attached to and closing the opposite end of said cylindrical wall,
   b. at least one conduit means attached to said cylindrical wall to direct combustible material tangentially into said combustion chamber through said at least one inlet opening, and
   c. ignition device to ignite said combustible materials.
2. A furnace according to claim 1, characterized by a deflection means located at the tangentially directed inlet and arranged to deflect admitted products towards the outer wall of the combustion chamber.
3. A furnace according to claim 2, characterized in that the said deflection means consists of an extended portion of the wall of the combustion chamber.
4. A furnace according to claim 2, characterized in that on the outside of that section of the outer wall of the combustion chamber towards which the admitted products are deflected there is a duct for supply of preheated intake air, said wall section being provided with perforations so that the air is supplied directly to the fed-in products.
5. A furnace according to claim 1, characterized in that an essential part of the combustion chamber is surrounded by an intake duct for intake air, which during absorption of heat serves for cooling of the outer wall of the combustion chamber.
6. A furnace according to claim 1, the furnace cylinder having an essentially vertical axis direction, characterized in that the bottom part of the furnace has a largely conical shape for collection of sand and similar incombustible particles, a discharge device being connected to the conical bottom part of the furnace.

* * * * *